United States Patent
Aoki et al.

(10) Patent No.: US 10,340,825 B2
(45) Date of Patent: Jul. 2, 2019

(54) MOTOR DRIVING DEVICE, METHOD, AND PROGRAM

(71) Applicant: Renesas Electronics Corporation, Tokyo (JP)

(72) Inventors: Takayuki Aoki, Tokyo (JP); Takahito Ishino, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 15/900,937

(22) Filed: Feb. 21, 2018

(65) Prior Publication Data

US 2018/0287525 A1 Oct. 4, 2018

(30) Foreign Application Priority Data

Mar. 30, 2017 (JP) .................................. 2017-067316

(51) Int. Cl.
| | |
|---|---|
| *H03K 5/00* | (2006.01) |
| *H02P 6/182* | (2016.01) |
| *H02P 6/20* | (2016.01) |
| *H02P 6/15* | (2016.01) |

(52) U.S. Cl.
CPC .............. *H02P 6/182* (2013.01); *H02P 6/157* (2016.02); *H02P 6/20* (2013.01); *H02P 2203/03* (2013.01)

(58) Field of Classification Search
CPC .................................................... H02P 2203/03
See application file for complete search history.

(56) References Cited

U.S. PATENT DOCUMENTS

| | | | | |
|---|---|---|---|---|
| 4,888,533 A | * | 12/1989 | Gotoh ..................... | H02P 6/085 318/524 |
| 2016/0094168 A1 | | 3/2016 | Maekawa et al. | |

FOREIGN PATENT DOCUMENTS

JP          2016-073041 A          5/2016

* cited by examiner

*Primary Examiner* — Karen Masih
(74) *Attorney, Agent, or Firm* — McDermott Will & Emery LLP

(57) ABSTRACT

An initial position determination process and a rotation driving process are both attained. A motor includes a rotor having a permanent magnet with a plurality of magnetic poles and a stator having coils with a plurality of phases. A voltage signal generation part generates a voltage signal corresponding to an electric current flowing through each of the coils with the phases of the stator. A filter part includes a first filter and a second filter. The voltage signal is inputted to a comparator through the filter part. A control part controls such that the first filter whose filter constant is larger is selected when performing the initial position determination process of the rotor and the second filter whose filter constant is smaller is selected when performing the rotation driving process.

12 Claims, 10 Drawing Sheets

MOTOR DRIVING DEVICE, METHOD, AND PROGRAM

CROSS-REFERENCE TO RELATED APPLICATIONS

The disclosure of Japanese Patent Application No. 2017-067316 filed on Mar. 30, 2017 including the specification and drawings and abstract is incorporated herein by reference in its entirety.

BACKGROUND

The present invention relates to a motor driving device, a method, and a program and, in particular, relates to a motor driving device, a method, and a program for use in rotation driving of a permanent-magnet synchronous motor.

The Patent Document 1 discloses a semiconductor device for use in drive control of a brushless DC (Direct Current) motor. In Patent Document 1, in order to determine a stop position of a rotor, prior to rotation driving of the rotor, electric currents are sequentially supplied to coils with a plurality of phases of a stator. When an electric current is supplied to a coil with each phase, easiness of the electric current flowing from the conductive coil through a coil with another phase coupled to the conductive coil varies due to an effect of a magnetic flux of a stopped rotor. In Patent Document 1, a difference in the ease of flow of an electric current flowing through the coils with respective phases is detected using a comparator and, based on a determination result thereof, a stop position (initial location) of the rotor with respect to the stator is determined.

Moreover, according to Patent Document 1, when determining a difference in easiness of the current flowing through the coils with respective phases, a predetermined voltage generated by a DAC (Digital to Analog Converter) is compared using the comparator with a signal corresponding to a magnitude of the electric current flowing through the coil with each phase, and time required for the signal corresponding to the magnitude of the electric current flowing through the coil with each phase to arise up to the predetermined voltage is measured. Furthermore, Patent Document 1 discloses a technique in which, during a high-speed rotation of the rotor, a voltage of an electrically non-conductive phase is monitored with use of the comparator that has been used in determining the initial position of the rotor and electrically conductive coil phases are switched.

PATENT DOCUMENT

[Patent Document 1] Japanese Unexamined Patent Application Publication No. 2016-73041

SUMMARY

In the Patent Document 1, however, the same circuit configuration is used in both the initial position determination and the high-speed rotation driving. Therefore, the technology described in Patent Document 1 had a difficulty in achieving both the processes.

The above and other objects and new features will be obvious from the description of the present specification and the attached drawings.

According to one embodiment, the motor driving device includes: a voltage signal generation part which generates a voltage signal corresponding to an electric current flowing through each of coils with a plurality of phases of a stator; and a comparator to which the voltage signal is inputted through the filter part including a first filter and a second filter. When the initial position determination process of the rotor is performed in the filter part, the first filter whose filter constant is larger is selected. Further, when the rotation driving process is performed, the second filter whose filter constant is smaller is selected.

According to the above one embodiment, it becomes possible to attain both the initial position determination process and the rotation driving process of the rotor.

BRIEF DESCRIPTION OF THE DRAWINGS

FIG. 5 is a waveform chart in which FIGS. 5A to 5C show waveform examples of respective parts at the time of measuring the voltage rise time;

FIG. 8 is a waveform chart in which FIGS. 8A to 8G show waveform examples of respective parts at the time of the initial position determination process;

FIG. 9 is a waveform chart in which FIGS. 9A to 9G show waveform examples of respective parts at the time of the rotation driving process of the rotor;

FIG. 12 is a waveform chart in which FIGS. 12A to 12C show waveform examples of respective parts before and after switching filters.

DETAILED DESCRIPTION

Figure 1:
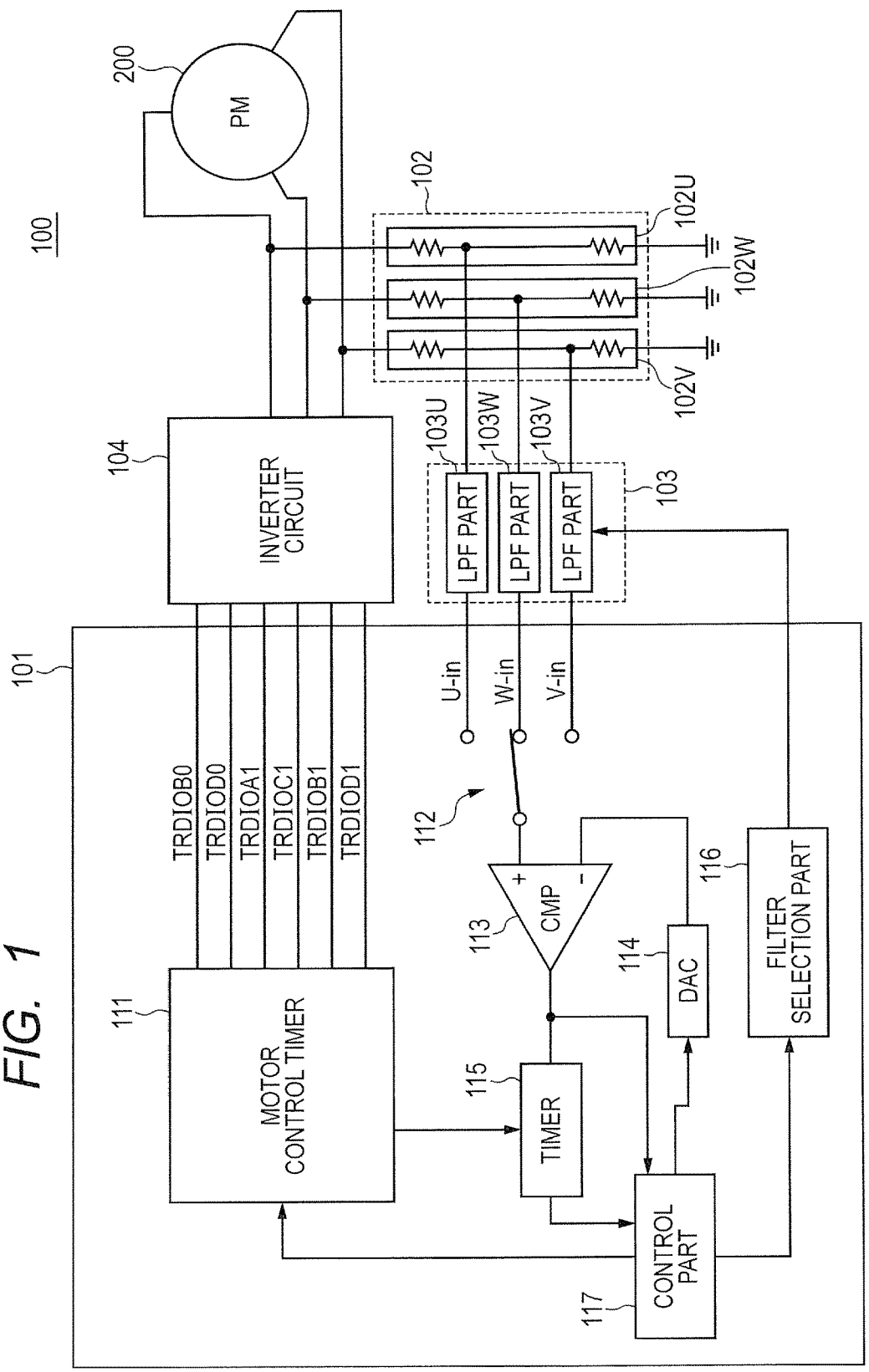
FIG. 1 is a block diagram showing a motor driving device according to Embodiment 1.

Hereinafter, with reference to drawings, embodiments to which means for solving the above problem is applied will be explained in detail. For clarity of explanation, the following descriptions and drawings are appropriately omitted and simplified. In addition, each component described in the drawings as a functional block that performs various processing can be configured with a CPU (Central Processing Unit), a memory, and another circuit as hardware, and is achieved by programs loaded in the memory, etc. as software. Accordingly, it is to be understood by those skilled in the art that these functional blocks can be achieved in various forms by only the hardware, only the software, or a combination thereof, and the present invention is not limited to any one of them. It is to be noted that the same symbol is attached to the same component in each drawing, and that overlapping explanation is omitted as needed.

In addition, the programs described above are stored using various types of non-transitory computer-readable media, and can be supplied to a computer. The non-transitory computer readable media include various types of tangible storage media. Examples of the non-transitory computer readable medium include: a magnetic recording medium (for example, a flexible disk, a magnetic tape, a hard disk), a magneto-optical recording medium (for example, a magneto-optical disk); a CD-ROM (Read Only Memory); a CD-R, a CD-R/W; and a semiconductor memory (for example, a mask ROM, a PROM (Programmable ROM), an EPROM (Erasable PROM), a flash ROM, a RAM (Random Access Memory)). In addition, the programs may be supplied to the computer by various types of transitory computer readable media. Examples of the transitory computer readable medium include: an electrical signal; an optical signal; and an electromagnetic wave. The transitory computer readable medium can supply the program to the computer through a wired communication channel, such as an electric wire and an optical fiber, or a wireless communication channel.

In the following embodiments, when necessary, the present invention is explained by using separate sections or separate embodiments. However, those embodiments are not unrelated with each other, unless otherwise specified. That is, they are related in such a manner that one embodiment is a modified example, an application example, a detailed example, or a supplementary example of a part or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may also be used.

Further, in the following embodiments, the components (including operation steps and the like) are not necessarily indispensable except for cases where the component is explicitly specified or the component is obviously indispensable based on its principle. Similarly, in the following embodiments, when a shape, a position relation, or the like of a component(s) or the like is mentioned, shapes or the like that are substantially similar to or resemble that shape are also included in that shape except for cases where it is explicitly specified or they are eliminated based on its principle. This is also true for the above-described number or the like (including numbers, values, quantities, ranges, and the like).

Embodiment 1

FIG. 1 shows a motor driving device according to Embodiment 1. The motor driving device 100 includes a semiconductor device 101, a voltage signal generation part 102, a filter part 103, and an inverter circuit 104. The semiconductor device 101 includes a motor control timer 111, a selector 112, a comparator 113, a DAC (Digital to Analog Convertor) 114, a timer 115, a filter selection part 116, and a control part 117. The semiconductor device 101 is configured as a microcomputer unit (MCU: Micro Computer Unit) including a CPU (not shown), which performs calculation according to a program stored in an external memory or an internal memory, and a RAM.

The motor driving device 100 rotates a motor 200 which is a permanent-magnet synchronous motor. The motor 200 includes a rotor having a permanent magnet with a plurality of poles and a stator having coils with a plurality of phases. Hereinafter, there will be mainly explained an example where the motor 200 is a brushless motor having a configuration of 2 poles, 3 phases, and 3 slots. However, the number of magnetic poles in the rotor and the number of slots in the stator are not particularly limited to these. The motor 200 may be an inner-rotor type motor, or may be an outer-rotor type motor.

The inverter circuit 104 is coupled to each of the coils of the stator of the motor 200. The inverter circuit 104 includes, for example, a plurality of push-pull output circuits whose drive terminals are coupled to corresponding coils of the stator. The motor control timer 111 is used as an electrical conduction control part, and controls electrical conduction to each of the coils with the phases of the stator through the inverter circuit 104. The motor control timer 111 may be a timer which is capable of outputting, for example, a PWM (Pulse Width Modulation) signal.

The voltage signal generation part 102 includes a voltage signal generation parts 102U, 102V, and 102W which correspond to coils of respective phases of the stator. The voltage signal generation part 102U is coupled to a coil with a U phase, the voltage signal generation part 102V is coupled to a coil with a V phase, and the voltage signal generation part 102W is coupled to a coil with a W phase. The voltage signal generation parts 102U, 102V, and 102W include resistors which are respectively coupled to coils with the corresponding phases and generate voltage signals corresponding to electric currents flowing through respective coils. When magnitudes of the electric currents which flow through the coils with respective phases are the same, the voltage signals which the voltage signal generation parts 102U, 102V, and 102W generate have the same voltages.

The filter part 103 includes LPF (Low-Pass Filter) parts 103U, 103V, and 103W corresponding to coils with respective phases of the stator. The LPF part 103U receives a voltage signal from the voltage signal generation part 102U, and applies low-pass filter processing to the received voltage signal. The LPF part 103V receives a voltage signal from the voltage signal generation part 102V, and applies a low-pass filter processing to the inputted voltage signal. The LPF part 103W receives a voltage signal from the voltage signal generation part 102W, and applies a low-pass filter processing to the inputted voltage signal. Each of the LPF parts has two filters whose filter constants are different from each other. The filter selection part 116 selects filters to be used in the LPF parts 103U, 103V, and 103W.

The selector 112 outputs, to the comparator 113, one of a voltage signal U-in to which the filter processing outputted by the LPF part 103U is applied, a voltage signal V-in to which the filter processing outputted by the LPF part 103V is applied, and a voltage signal W-in to which the filter processing outputted by the LPF part 103W is applied. The DAC 114 outputs a predetermined reference voltage. The comparator 113 compares one of the voltage signals U-in, V-in, and W-in outputted from the selector 112 with the predetermined reference voltage. The timer 115 is a timer of a 64 MHz count, for example, and is used as a time measurement part which measures time. The timer 115 measures a voltage rise time which shows a time difference between a predetermined timing and a timing at which it is determined that one of the voltage signals U-in, V-in, and W-in is equal to the predetermined reference voltage (Vref1) in the comparator 113.

The control part 117 performs, with use of the comparison result in the comparator 113, an initial position determination process for determining an initial position of the rotor, and a rotation driving process for rotating the rotor. In the case where a filter constant is defined as a time constant, when performing the initial position determination process, the control part 117 controls the filter selection part 116 to select a filter with a large filter constant (time constant) among the filters included in the LPF parts 103U, 103V, and 103W. On the other hand, when performing the rotation driving process, the control part 117 controls the filter selection part 116 to select a filter with a small filter constant among the filters included in the LPF parts 103U, 103V, and 103W, when performing the rotation driving process.

In addition to the selection of the above filters, in the initial position determination process, with use of the motor control timer 111, the control part 117 supplies electric currents for measurement to coils by applying voltage pulses for measurement to the coils with the phases of the stator while changing electrically conductive phase. Further, the control part 117 controls the voltage signal generation part 102 to generate a voltage signal corresponding to an electric current flowing through each of coils with other phases coupled to the coils to which the voltage pulses for measurement are applied, and controls a timer 115 to measure a voltage rise time with respect to each of the coils with the other phases. The control part 117 determines an initial position of the rotor based on the measurement result of the voltage rise time.

On the other hand, in the rotation driving process, in addition to the selection of the above filters, with use of the motor control timer 111, the control part 117 supplies an exciting current from a coil of with one phase to a coil with another phase of the stator. Moreover, the control section 117 controls the voltage signal generation part 102 to generate the voltage signal corresponding to the induced electromotive force generated in the coil of an electrically non-conductive phase different from the phase to which the exciting current was supplied. The control part 117 rotates the rotor by switching the coil phase to which the exciting current is supplied based on a timing at which it is determined that the voltage signal is equal to the predetermined reference voltage in the comparator 113.

[Filter Part]

Figure 2:
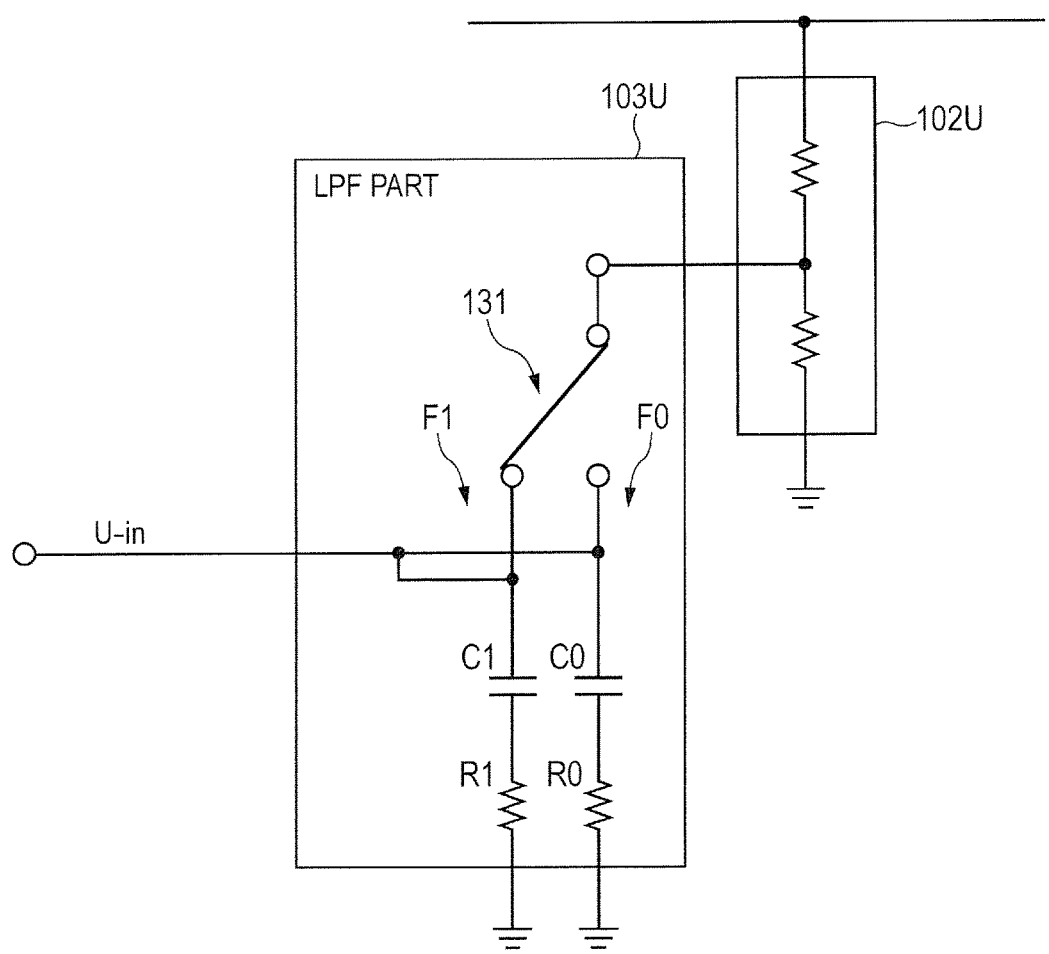
FIG. 2 is a block diagram showing a configuration example of an LPF part.

FIG. 2 shows a configuration example of the LPF part 103U. The LPF part 103U includes a selector 131, a filter F1, and a filter F0. The filter F1 is a low-pass filter which includes a resistor R1 and a capacitor C1. The filter F0 is a low-pass filter which includes a resistor R0 and a capacitor C0. The filter F1 and the filter F0 have filter constants (time constants) being different from each other. The filter constant of the filter F1 is larger than the filter constant of the filter F0.

The selector 131 supplies selectively the voltage signal which the voltage signal generation part 102U generated to the filter F1 or the filter F0. The selector 131 is controlled by the filter selection part 116 (see FIG. 1). During an initial position determination process of the rotor, the selector 131 selects the filter F1 whose filter constant is larger. During the rotation driving process of the rotor, the selector 131 selects the filter F0 whose filter constant is smaller. Also, in the above description, referring to FIG. 2, the configuration example of the LPF part 103U with the U phase has been explained. However, configurations of the LPF part 103V with a V phase and the LPF part 103W with a W phase may be similar to the case of the LPF part 103U.

Figure 3:
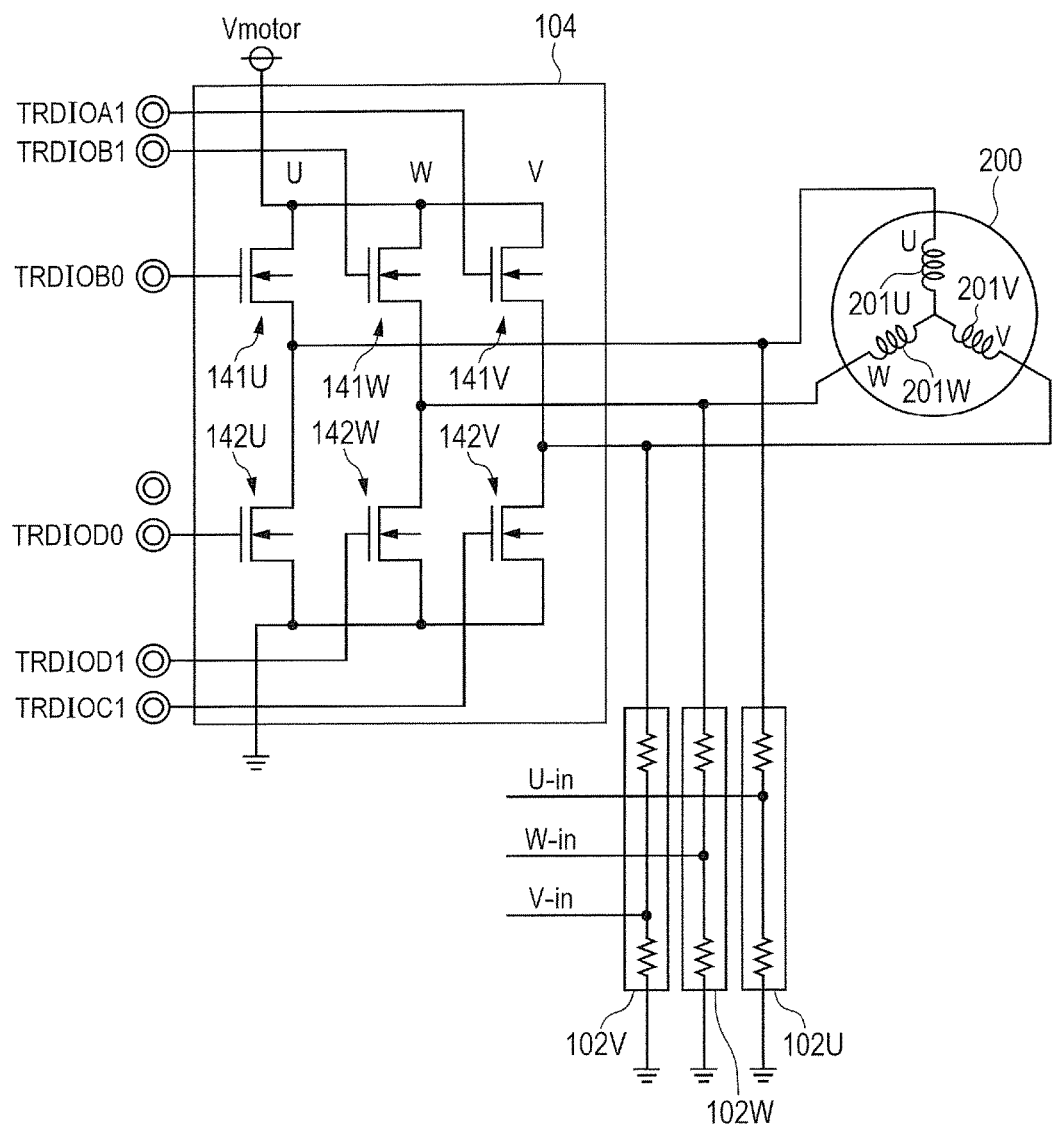
FIG. 3 is a block diagram showing a configuration example of an inverter circuit.

[Inverter Circuit] FIG. 3 shows a configuration example of the inverter circuit 104. The inverter circuit 104 includes, for example, transistors 141U, 141V, and 141W as well as transistors 142U, 142V, and 142W. In the inverter circuit 104, for example, an n-channel type field effect transistor is used for each transistor. The signal outputted by the motor control timer 111 (see FIG. 1) is inputted to a gate of each transistor. Though not shown in FIGS. 1 and 3, a pre-driver is arranged between the motor control timer 111 and the inverter circuit 104. The pre-driver converts each signal outputted by the motor control timer 111 into a gate voltage necessary for turning each transistor on in the inverter circuit 104.

The stator of the motor 200 includes coils 201U, 202V, and 202W with three phases (U phase, V phase, and W phase). In the stator, the coils 201U and 202V with respective phases are coupled to terminals, mutually, on the side opposite to a current input/output terminal side of the coil 202W. The coils 201U and 202V of respective phases and the current input/output terminal of the coil 202W are coupled to a power supply for a motor ($V_{Motor}$) through the transistors 141U, 141V, and 141W. Moreover, the current input/output terminals of the coils 201U, 202V, and 202W with the respective phases are grounded through the transistors 142U, 142V, and 142W. In the stator, the coils 201U, 202V, and 202W are wound around an iron core etc. such that, for example, when an electric current is supplied to the current input/output terminal from the motor power side, a side opposite to the rotor serves as an S pole and, when the electric current flows out of the current input/output terminal, a side opposed to the rotor serves as an N pole.

The transistors 141U and 142U form a push-pull output circuit corresponding to the coil 201U with the U phase. The transistor 141U becomes in an ON-state when a signal TRDIOB0 which the motor control timer 111 outputs is on an H level, and supplies an electric current to the coil 201U with the U phase. The transistor 142U becomes in an ON state when the signal TRDIOD0 outputted by the motor control timer 111 is on the H level and draws an electric current from the coil 201U with the U phase. When both the signals TRDIOB0 and TRDIOD0 are on the L level, the transistors 141U and 142V neither supply electric current to the coil 201U nor draw electric currents from the coil 201U. Also, hereinafter, in the push-pull output circuit, a phase where one transistor is in an ON state may be called an "electrically conductive phase" and a phase where both the transistors are in an OFF states may be called an "electrically non-conductive phase."

Transistors 141V and 142V form a push-pull output circuit which corresponds to a coil 201V with a V phase. The transistor 141V becomes in an ON-state when a signal TRDIOA1 outputted by the motor control timer 111 is on the H level and supplies an electric current to the coil 201V with the V phase. The transistor 142V becomes in an ON-state when a signal TRDIOC1 outputted by the motor control timer 111 is on the H level and draws an electric current from the coil 201V with the V phase. When both the signals TRDIOA1 and TRDIOC1 are on the L level, the transistors 141V and 142V neither supply the electric current to the coil 201V nor draw the electric current from the coil 201V.

Transistors 141W and 142W form a push-pull output circuit which corresponds to a coil 201W with a W phase. Transistor 141W becomes in an ON state when a signal TRDIOB1 outputted by the motor control timer 111 is on the H level, and supplies an electric current to the coil 201W with the W phase. The transistor 142W becomes in an ON-state when a signal TRDIOD1 outputted by the motor control timer 111 is on the H level and draws the electric current from the coil 201W with the W phase. When both the signals TRDIOB1 and TRDIOD1 are on the L level, the transistors 141W and 142W neither supply the electric current to the coil 201W nor draw the electric current from the coil 201W.

[Rotation Driving Control]

The motor control timer 111 controls the inverter circuit 104 to supply an exciting current through the coils with two phases among the coils with three phases at the time of the rotation of the rotor. The motor control timer 111 controls, for example, the signal TRDIOB0 to be on the H level and the transistor 141U to be in an ON state and, further, controls the signal TRDIOC1 to be on the H level and the transistor 142V to be in an ON state. In this way, through the inverter circuit 104, the motor control timer 111 supplies the exciting current from the coil 201U with the U phase toward the coil 201V with the V phase. At this time, signals TRDIOB1 and TRDIOC1 are on the L level, and the W phase becomes a non-conductive phase.

In the coil 201W with the W phase being electrically non-conductive phase, there occurs an induced electromotive force (counter-electromotive force) caused by the rotation of the rotor. The electric current resulting from the counter-electromotive force flows into the voltage signal generation part 102W from the coil 201W. The voltage signal generation part 102W generates a voltage signal W-in corresponding to the electric current flowing from the coil 201W with the W phase being electrically non-conductive phase. The voltage value of the voltage signal W-in varies according to a magnitude of the counter-electromotive force generated in the coil 201W with the W phase.

The selector 112 (see FIG. 1) selects the voltage signal W-in with the W phase being electrically non-conductive phase and outputs it to an input terminal of the comparator 113. During the rotation driving of the rotor, the DAC 114 outputs, as a reference voltage (Vref2), a voltage corresponding to the median of a voltage signal which varies according to the counter-electromotive force. The comparator 113 changes the output signal when the voltage signal W-in inputted through the selector 112 becomes equal to the reference voltage. With a timing at which the output signal of the comparator 113 is changed, the control part 117 changes the phase to which the exciting current is supplied. As commonly known, in a DC brushless motor, by changing the phase to which the exciting current is supplied every time the rotor rotates by a predetermined angle, in the stator, it becomes possible to generate a rotational magnetic field which rotates the rotor in a predetermined direction.

[Initial Position Determination]

During the initial position determination of the rotor, the motor control timer 111 controls one of the transistors 141U to 141V of the inverter circuit 104 to be in an ON state for a predetermined period and the rest of the transistors 141U to 141V and the transistors 142U to 142W to be in an OFF state. In other words, the motor control timer 111 applies a voltage pulse for measurement to an end of the coil of one phase among the coils of three phases through the inverter circuit 104. When the voltage pulse for measurement is impressed, an electric current flowing through each coil is lower than the exciting current and, even if the electric current is supplied to each coil, the rotor shall not rotate. The motor control timer 111 applies the voltage pulse for measurement to the coil 201U with the U phase through the inverter circuit 104 by controlling, for example, the signal TRDIOB0 to be on the H level and the transistor 141U to be in an ON state. At this time, all the remaining signals are on the L level and the V phase and the W phase become electrically non-conductive phases.

When the voltage pulse for measurement is applied to one end of the coil 201U with the U phase, an electric current (electric current for measurement) is supplied to the coil 201U with the U phase from the power supply for the motor. The electric current (part of it) supplied to the coil 201U with the U phase passes through the coil 201V with a V phase, and flows into the voltage signal generation part 102V. Moreover, the electric current (part of it) supplied to the coil 201U with the U phase passes through a coil 201W with a W phase, and flows into a voltage signal generation part 102W. The voltage signal generation part 102V generates a voltage signal V-in corresponding to the electric current flown in from the coil 201V with the V phase being an electrically non-conductive phase. Moreover, the voltage signal generation part 102W generates a voltage signal W-in corresponding to the electric current flown in from the coil 201W with the W phase being electrically non-conductive phase.

The selector 112 selects a voltage signal V-in with the V phase, for example, and outputs it to an input terminal of the comparator 113. At the time of determining the initial position of the rotor, the DAC 114 outputs a reference voltage (Vref1). The comparator 113 changes the output signal when the voltage signal V-in inputted through the selector 112 becomes equal to the reference voltage Vref1. The timer 115 starts counting with a predetermined timing such as a timing at which the motor control timer 111 has made the signal TRDIOB0 on the H level. The timer 115 ends the count operation, if the output signal in the comparator 113 is changed. A count value of the timer 115 shows a time difference (voltage rise time) between a timing at which it is determined that the voltage signal V-in is equal to the reference voltage Vref1 in the comparator 113 and a predetermined timing. Similarly, regarding the voltage signal W-in with the W phase, a voltage rise time is measured using the timer 115.

When supplying electricity to a coil with each phase (applying a voltage pulse for measurement) while changing electrically conductive phases, the control part 117 measures a voltage rise time of a voltage signal in an electrically non-conductive phase. The control section 117 determines the orientation (stop position) of the rotor in a halted state based on the measurement result of the voltage rise time. The control section 117 starts a rotation driving process after detection of the initial position, and rotates the rotor. The control section 117 determines an electrically conductive phase of the coil for rotating the rotor in the predetermined direction according to the determination result of the initial position of the rotor in the rotation driving process.

[Principle of Initial Position Determination]

Figure 4:
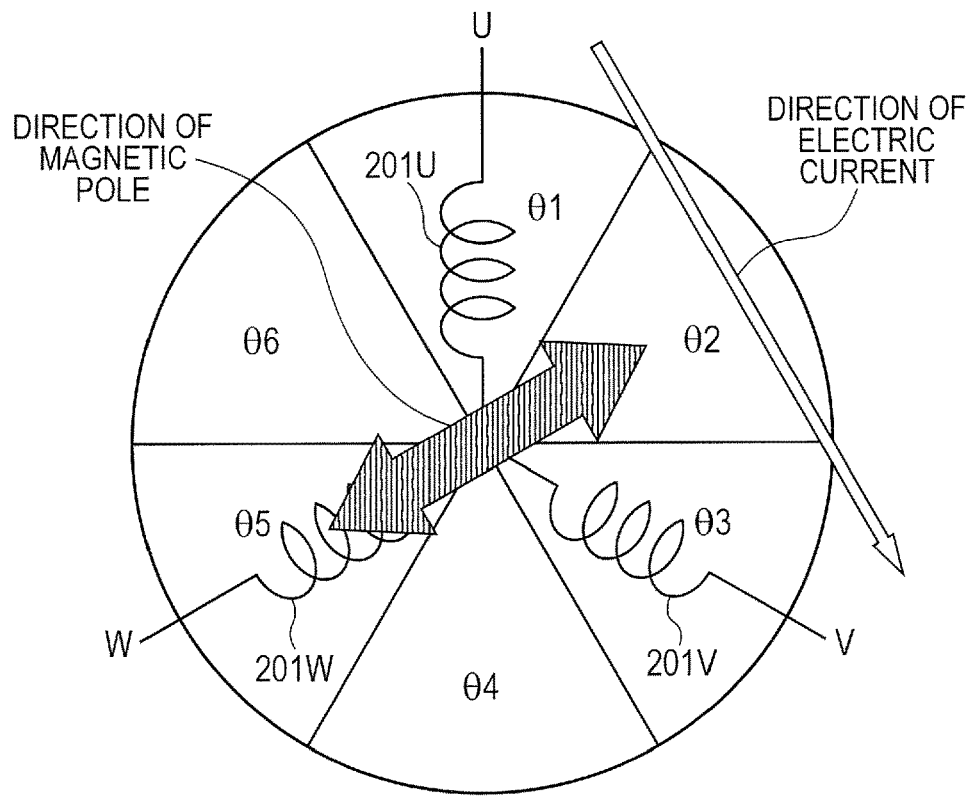
FIG. 4 is a schematic diagram showing the relationship between an orientation of the electric current in the stator and an orientation of the magnetic pole in the rotor.

FIG. 4 shows the relationship between a direction of the electric current in the stator and a direction of the magnetic pole in the rotor. For example, in the initial position determination process of the rotor, it is determined in which of the six regions θ1 to θ6 shown in FIG. 4 the rotor (magnetic pole) is located. An inductance between current input/output terminals of each coil of the stator varies according to the orientation of the magnetic pole of the rotor. The rise in electric current flowing through each coil becomes steeper as the inductance gets smaller and the rise in electric current becomes milder as the inductance gets greater.

For example, when the magnetic pole of the rotor exists in the direction of θ2 and θ5 shown in FIG. 4, the inductance between the coil 201U and the coil 201V becomes maximum, and the rise of the electric current which flows between U phase and V phase becomes milder than the rise of the electric current which flows between other phases. To put it differently, when the rise in the electric current flowing between the U phase and the V phase is the mildest, it can be determined that the magnetic pole of the rotor exists in the direction of θ2 and θ5. When the magnetic pole of the rotor exists in the direction of θ1 and θ4, the inductance between the coil 201V and the coil 201W reaches its maximum, and the rise in electric current flowing between the V phase and the W phase becomes milder than the rise in electric current flowing between other phases. When the magnetic pole of the rotor exists in θ3 and θ6, the inductance between the coil 201U and the coil 201W reaches its maximum, and a rise in electric current flowing between the U phase and the W phase becomes milder than the rise in electric current flowing between other phases.

When a voltage pulse for measurement is applied to a coil of one phase as a result of the above change in inductance, the time required for the electric current flowing through a coil with an electrically non-conductive phase to reach an current value of a regular time varies according to a position of the rotor. The length of the voltage rise time measured using the timer 115 corresponds to the magnitude of the inductance. It becomes possible to determine the relationship in size of the inductance among the phases by measuring the voltage rise time with use of the timer 115 in each of the electrically non-conductive phases while changing the coil phase to which the voltage pulse for measurement is applied. Based on the relationship in size, it becomes possible to determine the location of the rotor.

[Voltage Rise Time]

Figure 5:
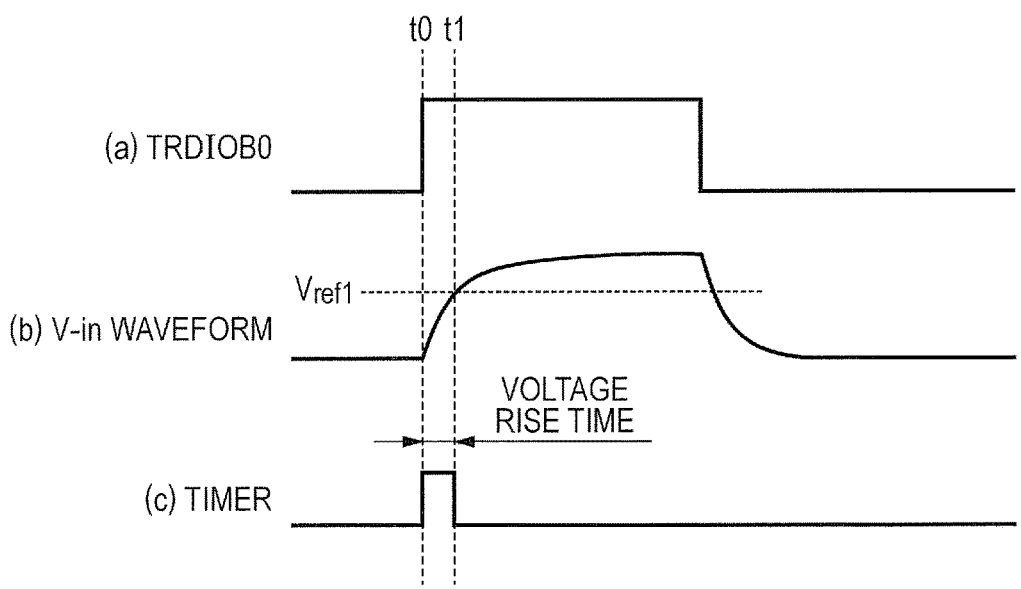

FIG. 5 is a waveform chart in which FIGS. 5A to 5C show waveform examples of respective parts at the time of measuring a voltage rise time. Hereafter, explanations will be given as to an electric current which flows through the coil 201V with the V phase when the coil U with the U phase is made to be conductive, and measurement of the voltage rise time in the timer 115. It is assumed that, prior to the measurement of the voltage rise time, in the LPF part 103V, a filter F1 (see FIG. 2) whose filter constant is large is selected, and the selector 112 has selected the voltage signal V-in inputted through the LPF part 103V (filter F1).

At time t0, the motor control timer 111 controls the signal TRDIOB0 to be on the H level (see FIG. 5A) and the transistor 141U (see FIG. 3) on the side of the motor power supply with the U phase included in the inverter circuit 104 to be in an ON state. With a timing at which the signal TRDIOB0 is made to be on the H level, the timer 115 starts a count operation (see FIG. 5C).

The voltage signal generation part 102V generates the voltage signal V-in of a voltage value which corresponds to the magnitude of an electric current flown in through the coil 201V with the V phase from the coil 201U with the U phase. The voltage signal V-in is inputted to an input terminal of the comparator 113 through the filter F1 of the LPF part 103V and the selector 112 (see FIG. 5B). In this regard, since the filter constant of the filter F1 is set to a relatively large value, a rise in the voltage signal V-in becomes milder than that of a case without using the filter F1.

When the voltage signal V-in becomes equal to the reference voltage Vref1 at time t1, the comparator 113 invert the output signal. In this regard, the reference voltage Vref1 is set as a voltage lower than the voltage of the voltage signal generated with respect to the electric current of the regular time flowing through a coil 201V which the voltage signal generation part 102V generates. The timer 115 stops counting when the output signal of the comparator 113 is inverted (see FIG. 5C). The timer 115 outputs a count value corresponding to the length of time from time t0 to time t1 to the control part 117. The count value of the timer 115 changes depending on the magnitude of the inductance between the terminals of respective phases.

[Operation Flow]

Figure 6:
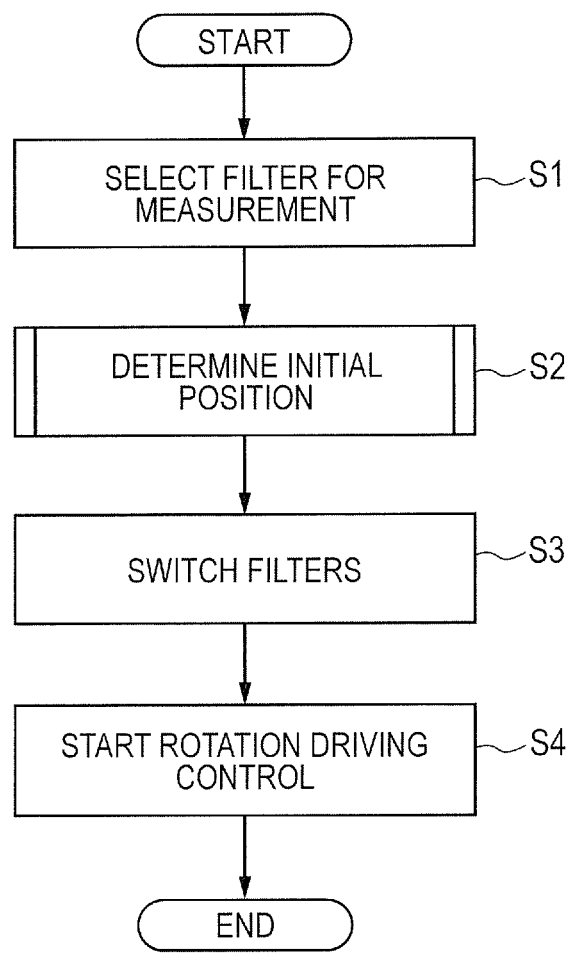
FIG. 6 is a flowchart showing a flow of the operation in the motor driving device.

Hereinafter, flows in operation will be explained. FIG. 6 shows an operation flow in the motor driving device. Prior to the initial position determination process of the rotor, the control part 117 controls the filter selection part 116 to select a filter F1 having a large filter constant in each of the LPF parts 103U, 103V, and 103W (step S1). Subsequently, the control part 117 starts the initial position determination process of the rotor (step S2).

Figure 7:
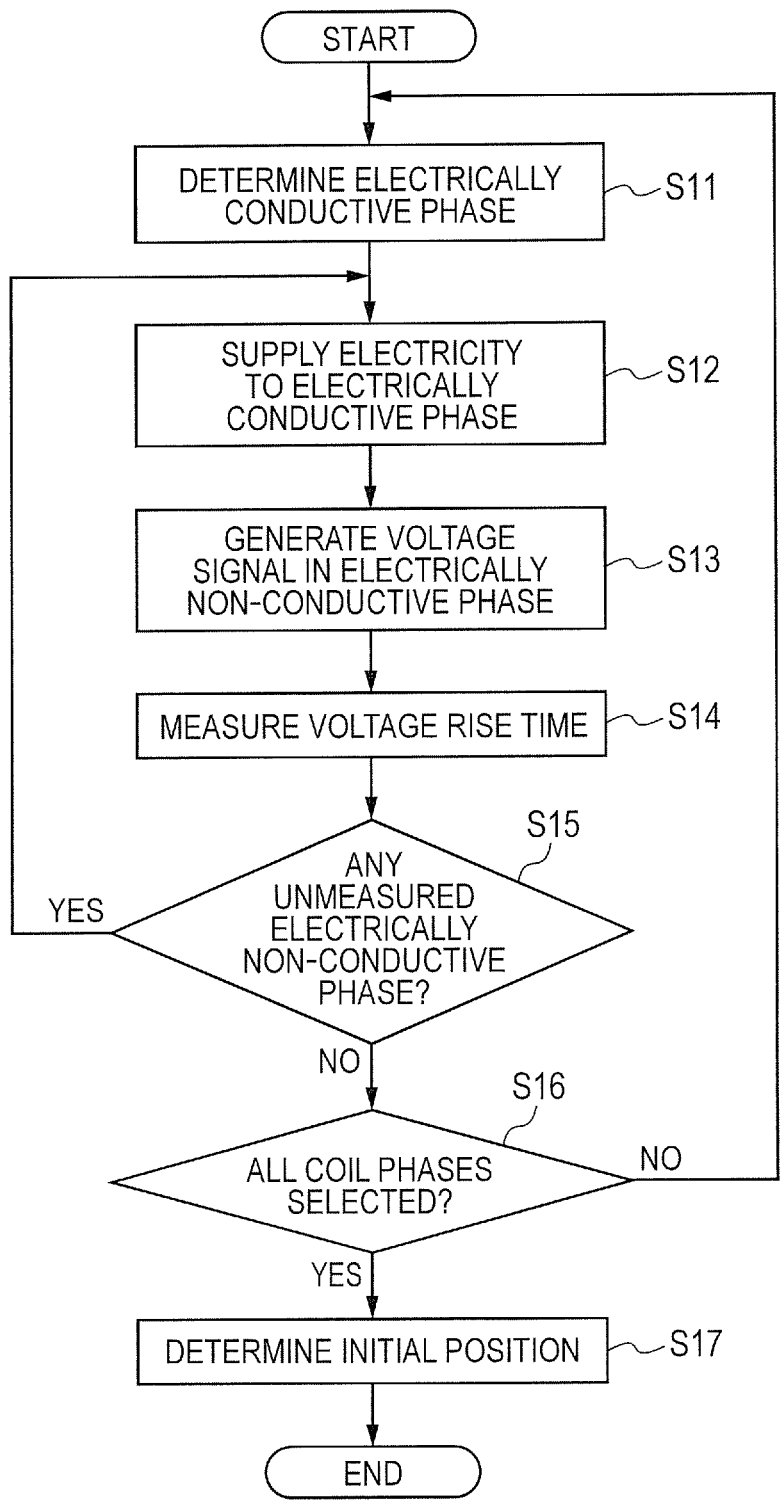
FIG. 7 is a flowchart showing a flow for an initial position determination process.

FIG. 7 shows an operation flow of the initial position determination process. The control part 117 determines a coil phase (electrically conductive phase) to which a voltage pulse for measurement is applied (step S11). For example, first, the control part 117 determines a U phase as an electrically conductive phase. Through the motor control timer 111, the control part 117 supplies an electric current for measurement to the coil with the electrically conductive phase determined in step S11 (step S12). In step S12, for example, the motor control timer 111 controls the signal TRDIOB0 to be on the H level and the transistor 141U of the inverter circuit 104 to be in an ON state. In this way, the electric current for measurement is supplied to the coil 201U with the U phase from a power supply for the motor through the transistor 141U. The timer 115 starts the count operation with a timing at which the signal TRDIOB0 becomes on the H level.

Prior to the supply of the electric current for measurement to the electrically conductive phase, the control part 117 selects one of the electrically non-conductive phases in the selector 112. The control part 117 controls, for example, the selector 112 to select s voltage signal V-in with a V phase. The electric current supplied to the electrically conductive phase is inputted to the voltage signal generation part 102 through the coil with the electrically non-conductive phase, and the voltage signal generation part 102 generates a voltage signal corresponding to the electric current flowing through the coil with the electrically non-conductive phase (step S13). For example, the electric current supplied to the coil 201U with the U phase flows into the voltage signal generation part 102V through the coil 201 with the V phase, and the voltage signal generation part 102V generates a voltage signal corresponding to the electric current flowing through the coil 201 with the V phase. The voltage signal thus generated passes through the filter F1 of the LPF part 103V, and is inputted to the comparator 113 through the selector 112.

The comparator 113 compares a voltage signal inputted through the selector 112 with a reference voltage Vref1 to be outputted by the DAC 114. The timer 115 continues a count operation until a timing at which it is determined that the voltage signal becomes equal to the reference voltage Vref1 in the comparator 113, and measures a voltage rise time (step S14). When the voltage rise time is measured, the control part 117 determines whether or not there is an electrically non-conductive phase whose voltage rise time has not been measured (step S15).

When it is determined that there is an unmeasured electrically non-conductive phase in step S15, the process returns to step S12, and the control part 117 supplies an electric current for measurement to a coil with an electrically conductive phase again. When the process returns to step S12, a voltage signal is generated in step S13 by a voltage signal generation part corresponding to the unmeasured electrically non-conductive phase, such as a voltage signal generation part 102W of the W phase. In step S14, as a voltage rise time, the timer 115 measures a time difference between a start of supplying an electric current to the coil 201U and a timing at which a voltage signal W-in inputted through the LPF part 103W and the selector 112 reaches the reference voltage Vref1.

When it is determined that there exists no electrically non-conductive phase which is not measured in step S15, the control part 117 determines whether or not all the phases have been selected as electrically conductive phases (step S16). When it is determined that all the phases are not selected as electrically conductive phases in step S16, the process returns to step S11 and the control part 117 determines a next electrically conductive phase. Subsequently, processes in steps S12 to S15 are performed. Then, a voltage rise time is measured as to each of electrically non-conductive phases coupled to electrically conductive phases determined in step S11.

When it is determined that there is no phase which has not been chosen as an electrically conductive phase in step S16, the control section 117 determines the initial position of the rotor based on the voltage rise time measured for every pattern of each electrically conductive phase and electrically non-conductive phase (step S17). A known algorithm can be used for detection of the initial position of the rotor.

Referring to FIG. 6 again, when determination of the initial position of the rotor is over, the control part 117 controls the filter selection part 116 to select a filter F0 whose filter constant is the smallest in each of the LPF sections 103U, 103V, and 103W (step S3). Then, with use of a determination result of the initial position of the rotor, the control part 117 starts a rotation driving process of the rotor (step S4). In the rotation driving process of the rotor, the control part 117 switches the electrically conductive phase to which the exciting current is supplied every time a voltage signal inputted to the comparator 113 through the filter F0 of the LPF part becomes equal to a reference voltage Vref2 outputted by the DAC 114 in the rotation driving process of the rotor.

[Example of Operation Waveform During Initial Position Determination]

Figure 8:
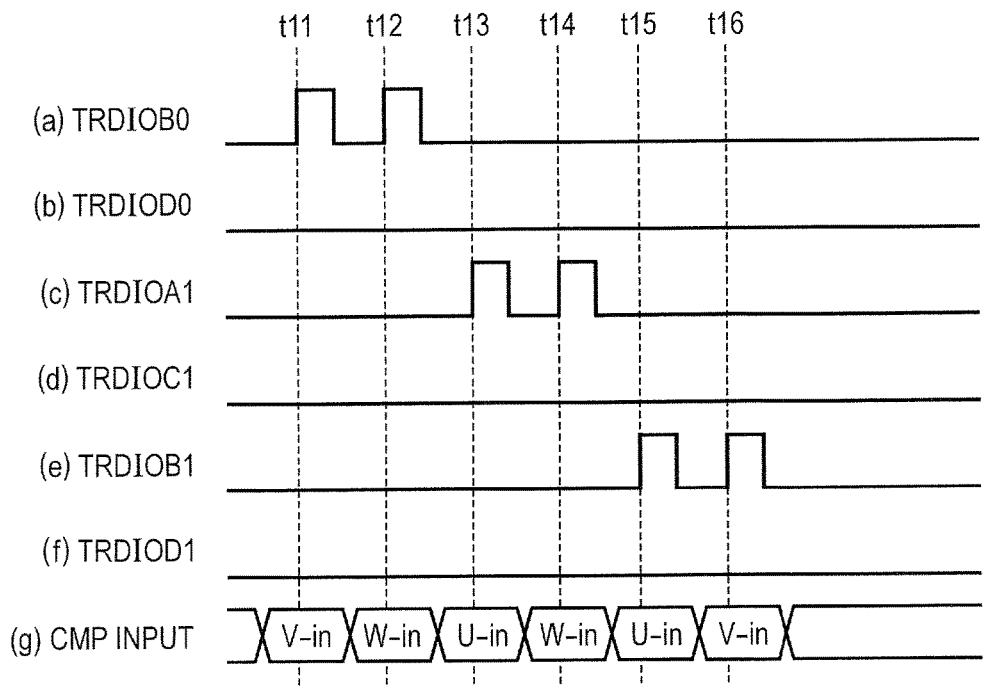

FIG. 8 is a waveform chart in which FIGS. 8A to 8G show operation waveform examples of respective parts during the initial position determination process. At time t11, among signals to be outputted to the inverter circuit 104, the motor control timer 111 controls only the signal TRDIOB0 to be on the H level, and supplies an electric current for measurement to the coil 201U with the U phase through the inverter circuit 104 (see FIG. 8A). At time t11, the selector 112 has selected the voltage signal V-in with the V phase (see FIG. 8G). As a voltage rise time, the timer 115 measures a time difference between time t11 and a timing at which it is determined that the voltage signal V-in reaches the reference voltage Vref1 in the comparator 113 (see FIG. 5B and FIG. 5C).

At time t12, again, the motor control timer 111 controls only the signal TRDIOB0 to be on the H level among the signals to be outputted to the inverter circuit 104, and supplies an electric current for measurement to the coil 201U with the U phase through the inverter circuit 104 (see FIG. 8A). At time t12, the selector 112 has selected the voltage signal W-in with the W phase (see FIG. 8G). The timer 115 measures a time difference between time t12 and a time at which it is determined that the voltage signal W-in has reached the reference voltage Vref1 in the comparator 113 as a voltage rise time.

Similarly, at time t13 and time t14, the motor control timer 111 controls the signal TRDIOA1 to be on the H level, and supplies an electric current for measurement to the coil 201V with V phase through the inverter circuit 104 (see FIG. 8A). At time t13, the selector 112 has selected a voltage signal U-in with the U phase. The timer 115 measures, as a voltage rise time, a time difference between time t13 and the time at which it is determined that the voltage signal U-in has reached the reference voltage Vref1 in the comparator 113. Moreover, at time t14, the selector 112 has selected the voltage signal W-in with the W phase, and the timer 115 measures, as a voltage rise time, a time difference between time t14 and a timing at which it is determined that the voltage signal W-in reaches the reference voltage Vref1 in the comparator 113.

Furthermore, at time t15 and time t16, the motor control timer 111 controls the signal TRDIOB1 to be on the H level, and supplies an electric current for measurement to the coil 201W with the W phase through the inverter circuit 104 (see FIG. 8A). At time t15, the selector 112 has selected the voltage signal U-in with the U phase, and the timer 115 measures, as a voltage rise time, a time difference between time t15 and a timing at which it is determined that the voltage signal U-in reaches the reference voltage Vref1 in the comparator 113. Moreover, at time t16, the selector 112 has selected the voltage signal V-in with the V phase. As a voltage rise time, the timer 115 measures a time difference between time t16 and the time at which it is determined that voltage signal V-in has reached the reference voltage Vref1 in the comparator 113.

In this regard, when the electrically conductive phase is the U phase, a voltage rise time measured with respect to the V phase is called "tc (VU)," and a voltage rise time measured with respect to the W phase is called "tc (WU)." Moreover, when the electrically conductive phase is the V phase, a voltage rise time measured with respect to the U phase is called "tc (UV)," and a voltage rise time measured with respect to the W phase is called tc (WV). Furthermore, when the electrically conductive phase is the W phase, a voltage rise time measured with respect to the U phase is called "tc (UW), and a voltage rise time measured with respect to the V phase is called "tc (VW)."

First, based on measurement results of the above voltage rise time, the control section 117 specifies whether the magnetic pole exists in a U direction, a V direction, or a W direction. In the measurement results of the voltage rise time, when the voltage rise time tc (VU) is the longest, the control part 117 determines that the magnetic pole of the rotor exists in a W phase direction, namely, in the direction of θ2 and θ5 (see FIG. 4). When the voltage rise time tc (WV) is the longest, the control part 117 determines that the magnetic pole of the rotor exists in a U phase direction, namely, in the direction of θ1 and θ4. Further, when the voltage rise time tc (UW) is the longest, the control part 117 determines that the magnetic pole of the rotor exists in a V phase direction, namely, in the direction of θ3 and θ6.

Subsequently, according to a combination with respect to directions in which the magnetic pole exists, the control part 117 finds the sum of two voltage rise time. Then, based on the sum of the voltage rise time, the control part 117 determines in which region the magnetic pole exists. Specifically, when it is determined in the above process that the magnetic pole exists in the W phase direction, the control part 117 finds the sum of the voltage rise time tc (UW) and tc (VW) and the sum of the voltage rise time tc (WV) and tc (WU), respectively. The control part 117 compares them, and if tc(UW)+tc(VW)>tc(WV)+tc (WU), determines that the magnetic pole exists in the region of θ2. If tc(UW)+tc (VW)<tc(WV)+tc (WU), the control part 117 determines that the magnetic pole exists in a region of θ5.

When it is determined that the magnetic pole exists in a U phase direction, the control part 117 finds the sum of the voltage rise time tc (VU) and tc (WU) and the sum of the voltage rise time tc (UW) and tc (UV), respectively. The control part 117 compares them, and if tc(VU)+tc(WU)>tc (UW)+tc (UV), determines that the magnetic pole exists in the region of θ4. If tc(VU)+tc(WU)<tc(UW)+tc (UV), the control part 117 determines that the magnetic pole exists in the region of θ1.

When it is determined that the magnetic pole exists in the V phase direction, the control part 117 finds the sum of the voltage rise time tc (UV) and tc (WV) and the sum of the voltage rise time tc (VU) and tc (VW), respectively. The control part 117 compares them, and if tc (UV)+tc (WV)>tc (VU)+tc (VW), the control part 117 determines that the magnetic pole exists in the region of θ6. If tc(UV)+tc(WV) <tc(VU)+tc (VW), the control part 117 determines that the magnetic pole exists in the region of θ3.

When the difference between the above-described sums to compare is smaller than a predetermined threshold value, the control part 117 may change the reference voltage Vref1 to be outputted by the DAC 114 and measure a voltage rise time again. The predetermined threshold value to be compared with the difference between the above sums is a parameter which controls detection precision set in advance according to a time resolution in the timer 115 and the number of regions of the initial position determination, etc. When a difference between the above-described sums is smaller than a predetermined threshold value, for example, the control part 117 may set a reference voltage Vref1 to a voltage higher than the present reference voltage Vref1 by a predetermined voltage within a voltage range equal to or lower than a maximum value Vref1_max of the predetermined reference voltage.

[Example of Operation Waveform During Rotation Driving]

Figure 9:
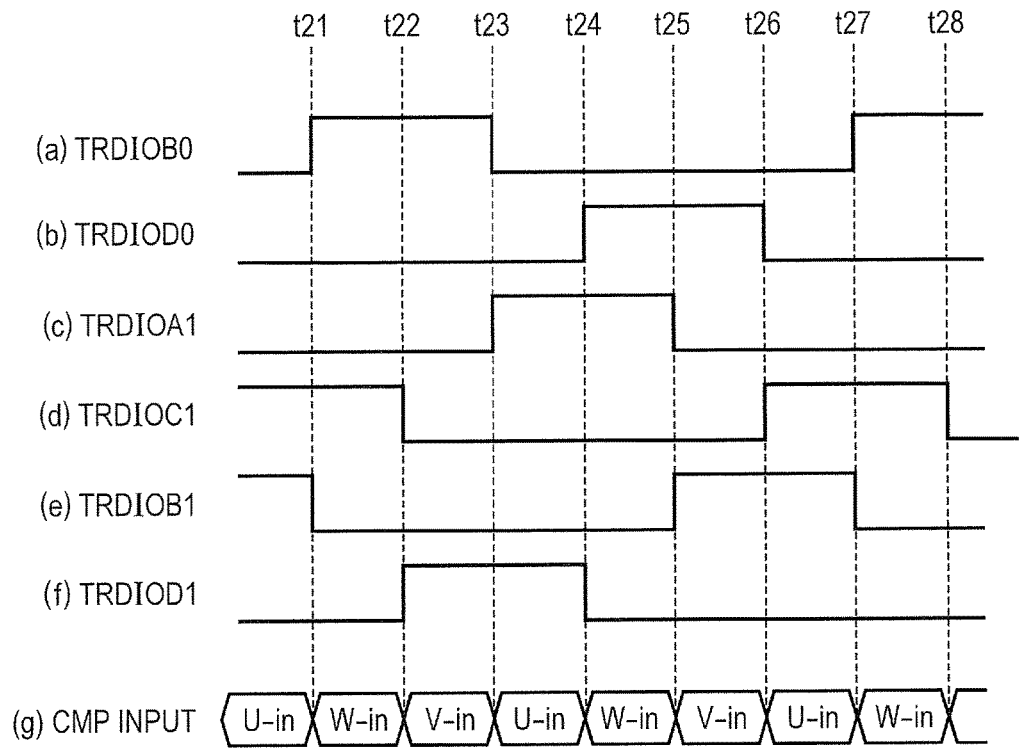

FIG. 9 is a waveform chart in which FIGS. 9A to 9G show operation waveform examples of respective parts during the rotation driving of the rotor. The exciting current shall be supplied to the coils 201V and 201W in a direction towards the V phase from the W phase at a point before time 21. Moreover, the selector 112 has selected the voltage signal U-in with the U phase at the point before the time 21 (see FIG. 9G). In the comparator 113, at time t21, when it is determined that the voltage signal U-in is equal to a reference voltage Vref2 corresponding to a central level thereof, the control part 117 switches the coil phase to which the exciting current is supplied.

At time t21, the motor control timer 111 controls the signal TRDIOB0 being outputted to the inverter circuit 104 to be on the H level from the L level (see FIG. 9A) and the signal TRDIOB1 to be on the L from the H level (see FIG. 9E). At this time, the motor control timer 111 keeps the signals TRDIOD0 (see the FIG. 9B), TRDIOA1 (see FIG. 9C), and TRDIOD1 (see FIG. 9F) to be on the L level, and the signal TRDIOC1 (see FIG. 9D) to be on the H level. The exciting current is supplied to the coils 201U and 201V toward the V phase from the U phase by the signals TRDIOB0 and TRDIIC1 becoming on the H level.

At time t21, the W phase becomes an electrically non-conductive phase, and the selector 112 selects a voltage signal W-in with the W phase (see FIG. 9G). The comparator 113 compares the voltage signal W-in with the reference voltage Vref2. At time t22, when it is determined that the voltage signal W-in is equal to the reference voltage Vref2 in the comparator 113, the control part 117 switches the coil phase to which the exciting current is supplied.

At time t22, the motor control timer 111 controls the signal TRDIOD1 being outputted to the inverter circuit 104 to be on the H level from the L level (see FIG. 9F) and the signal TRDIOC1 to be on the L level from the H level (see FIG. 9D). At this time, the motor control timer 111 keeps the signals TRDIOD0 (see FIG. 9B), TRDIOA1 (see FIG. 9C), and TRDIOB1 (see FIG. 9E) on the L level. On the other hand, the motor control timer 111 keeps the signal TRDIOB0 (see FIG. 9A) on the H level. The exciting current is supplied to the coils 201U and 201W toward the W phase from the U phase by the signals TRDIOB0 and TRDIID1 becoming on the H level. Moreover, the V phase becomes an electrically non-conductive phase, and the selector 112 selects the voltage signal V-in with the V phase (see FIG. 9G).

At time t23, when it is determined that the voltage signal V-in is equal to the reference voltage Vref2 in the comparator 113, the motor control timer 111 controls the signal TRDIOA1 to be on the H level from the L level (see FIG. 9C) and the signal TRDIOB0 to be on the L level from the H level (see FIG. 9A). At this time, the exciting current is supplied to the coils 201V and 201W toward the W phase from the V phase. Moreover, the U phase becomes an electrically non-conductive phase, and the selector 112 selects the voltage signal U-in with the U phase (see FIG. 9G).

Hereafter, similarly, at time t24, t25, t26, t27, and t28 where it is determined that the voltage signal with the electrically non-conductive phase becomes equal to the reference voltage Vref2 in the comparator 113, the phase to which the exciting current is supplied is switched. Moreover, the selector 112 selects the voltage signal with the phase that has become electrically non-conductive, and the voltage signal with the phase hat has become electrically non-conductive is monitored in the comparator 113. In the motor 200, the rotor can be rotated by switching the phase to which the exciting current is supplied in synchronism with the rotation of the rotor.

[Outline]

According to the present embodiment, the LPF parts 103U, 103V, and 103W have two filters F1 and F0 whose filter constants are different from each other. When the initial position determination process of the rotor is performed, the filter selection part 116 selects the filter F1 whose filter constant is large. The voltage signal U-in, V-in, or W-in to which the low pass-filter processing is applied using the filter F1 is inputted to the comparator 113 through the selector 112 at the time of the initial position determination process. At the time of the initial position determination process, the motor control timer 111 supplies electric current for measurement to the coils with the phases of the stator while changing electrically conductive phases. Also, the voltage signal generation part 102 generates a voltage signal corresponding to an electric current flowing through each of coils with other phases coupled to the coils to which the electric currents for measurement are supplied. The timer 115 measures, with respect to each of coils with other phases, the voltage rise time which shows the time difference between the predetermined timing and the timing at which it is determined that the voltage signal to which the low-pass filter processing is applied with use of the filter F1 is equal to the reference voltage Vref1 in the comparator 113. Thus, it becomes possible to detect the initial position of the rotor by using the measurement result of this voltage rise time.

On the other hand, when the rotation driving process of the rotor is performed, the filter selection part 116 selects the filter F0 whose filter constant is small. The voltage signal U-in, V-in, or W-in to which the low-pass filter processing is applied using the filter F0 is inputted to the comparator 113 through the selector 112 at the time of the rotation driving process of the rotor. During the rotation driving process of the rotor, the motor control timer 111 supplies an exciting current to the coil with the electrically conductive phase determined based on the determination result of the initial position of the rotor, and the motor control timer 111 starts the rotation driving of the rotor. The voltage signal generation part 102 generates the voltage signal corresponding to the induced electromotive force generated in the coil with the electrically non-conductive phase, and the comparator 113 compares the reference voltage Vref2 with the voltage signal to which the low-pass filter processing is applied using the filter F0. By changing the phase of the coil to which the exciting current is supplied at the timing at which it is determined that the voltage signal is equal to the reference-voltage Vref2 in the comparator 113, the control part 117 allows the rotor to rotate.

In this regard, when the electric current for measurement is supplied to the coil of one phase at the time of the initial position determination process, the voltage rise time measured with respect to the voltage signal with the electrically non-conductive phase generated in the voltage signal generation part 102 has a dominant capacity in a circuit. When the voltage rise time is too short for the time resolution of the timer 115, the measured voltage rise time does not vary depending on the location of the magnetic pole of the rotor. In that case, the initial position of the rotor cannot be determined. According to the present embodiment, the filter part 103 is inserted between the comparator 113 and the voltage signal generation part 102, and the voltage rise of the voltage signal inputted to the comparator 113 is mild compared with the case where the filter part 103 is not inserted.

However, the comparator 113 is used also at the time of rotation of the rotor. When the filter constant of the filter part 103 is large, a variation of the voltage signal according to the counter-electromotive force may become mild, and it may have a harmful effect on a rotation control of the rotor. According to the present embodiment, the filter part 103 includes the filter F1 and the filter F0. In the filter part 103, the filter F1 whose filter constant is large is selected at the time of the initial position determination process and the filter F0 whose filter constant is small is selected at the time of the rotation driving process. In this way, while making the voltage rise of the voltage signal mild at the initial position determination process, at the time of the rotation process, it becomes possible to make the voltage change of the voltage signal follow the counter-electromotive force generated in the electrically non-conductive phase, and the initial position determination can be performed without having a harmful effect on the rotation control of the rotor.

Embodiment 2

Next, Embodiment 2 will be explained. The present embodiment differs from Embodiment 1 in that the filter part 103 includes a plurality of low-pass filters to be used in the initial position determination process. Other aspects of Embodiment 2 may be the same as those of Embodiment 1.

[Filter Part]

Figure 10:
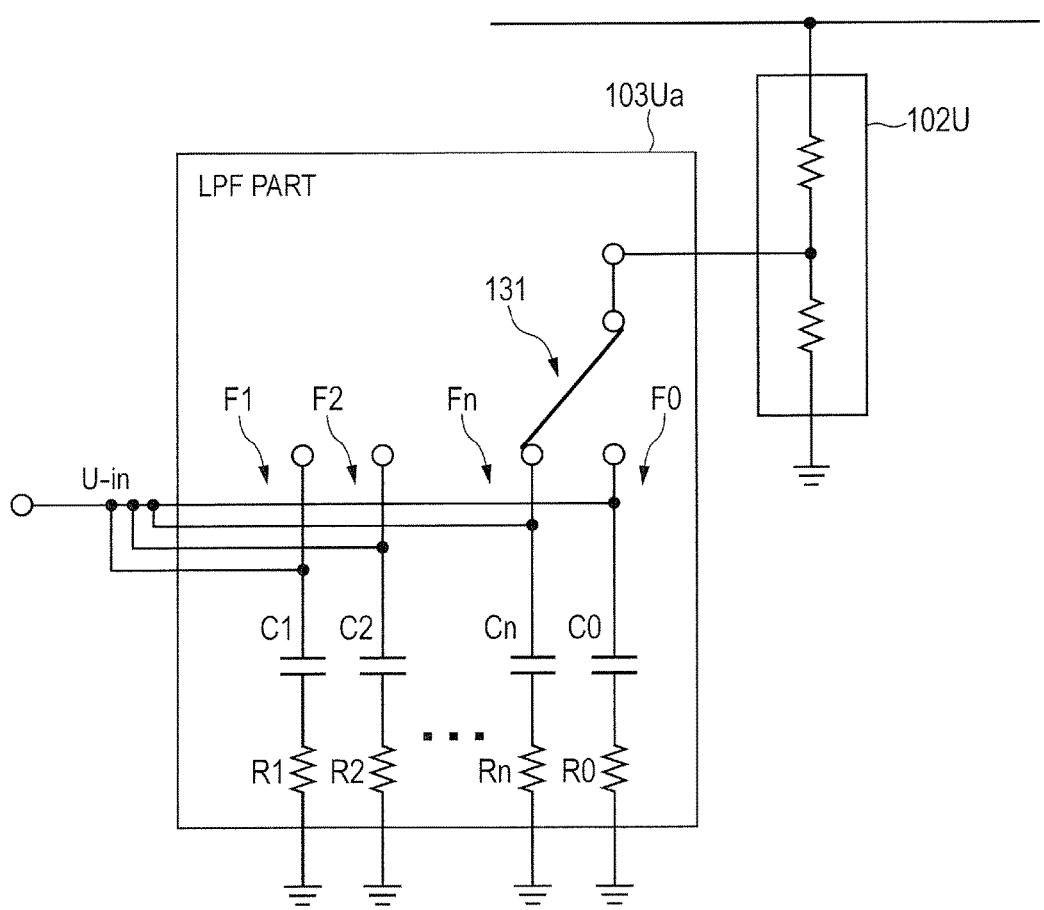
FIG. 10 is a block diagram showing a configuration example of an LPF part used in Embodiment 2.

FIG. 10 shows a configuration example of an LPF section 103Ua used in the present embodiment. With "n" being an integer of two or larger, the LPF section 103Ua includes a selector 131, filters F1 to Fn, and a filter F0. With "i" being an integer of one or larger and n or smaller, a filter Fi includes a resistor Ri and a capacitor Ci. Filter constants of filters Fi are different from one another and the larger the "i" is, the larger the filter constant becomes. That is, the filter constant of the filter F1 is the smallest, and the filter constant of the filter Fn is the largest.

The selector 131 selectively supplies a voltage signal generated by the voltage signal generation part 102U to any one of the filters F0 to Fn. The selector 131 selects one of the filters F1 to Fn at the time of the initial position determination process of the rotor, and the selector 131 selects the filter F0 at the time of the rotation driving process of the rotor. Also, in the above description, referring to FIG. 10, a configuration example of the LPF part 103Ua with the U phase has been explained. However, configurations of the LPF part with the V phase and the LPF part with the W phase may be the same as the case of the LPF part 103Ua.

[Operation Flow]

Figure 11:
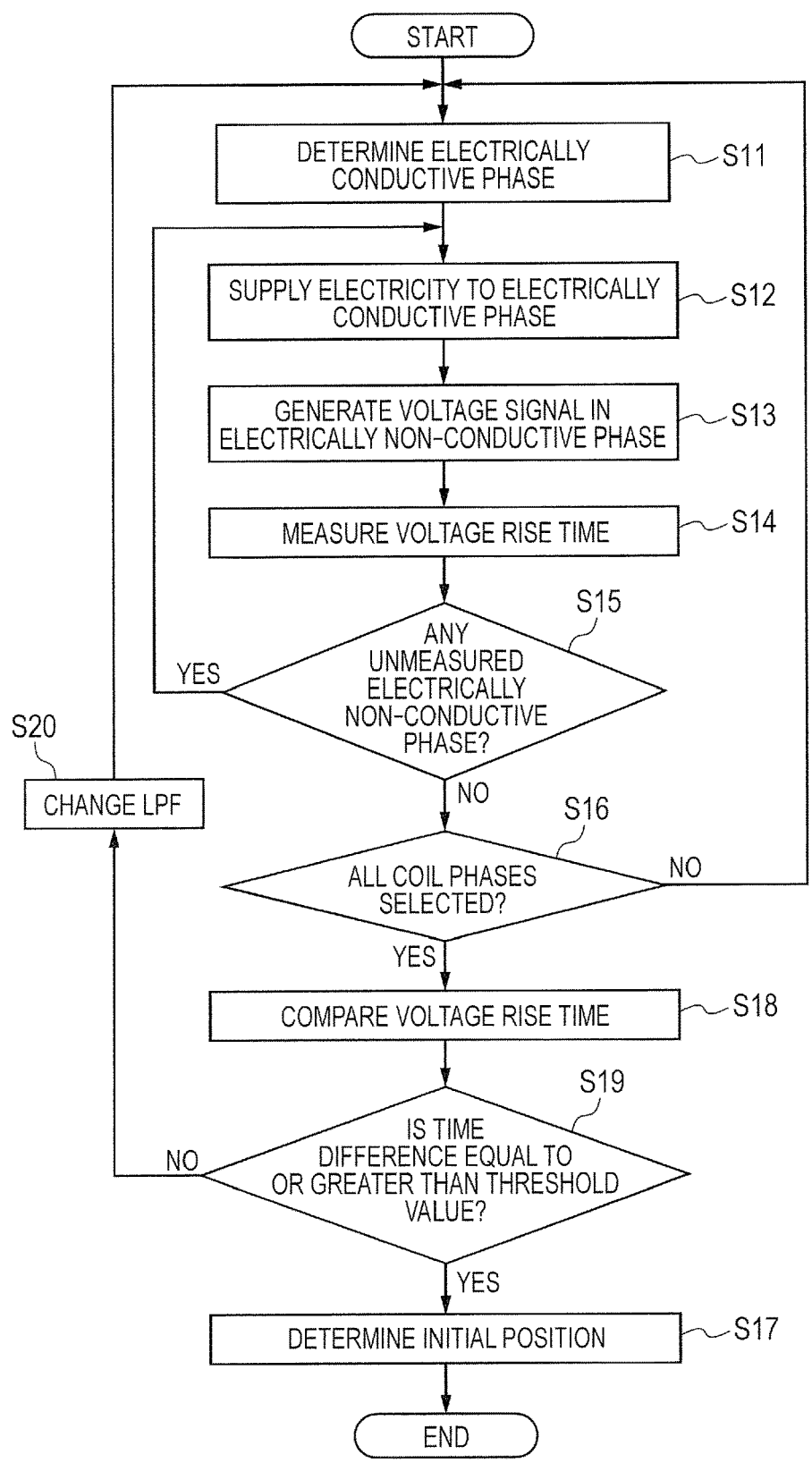
FIG. 11 is a flowchart showing a flow for an initial position determination process in Embodiment 2.

FIG. 11 shows a flow of the initial position determination process according to the present embodiment. The filter selection part 116 selects one of the filters F1 to Fn (see FIG. 10) included in the LPF part. A filter to be selected in an initial state may be the filter F1 whose filter constant is the smallest, or it may be one of other filters. The control part 117 determines an electrically conductive phase (step S11). Through the motor control timer 111, the control part 117 supplies an electric current for measurement (step S12) to the coil with the electrically conductive phase determined in step S11. With a timing at which the electric current for measurement is supplied, the timer 115 starts a count operation.

The electric current supplied to the electrically conductive phase is inputted to the voltage signal generation part 102 through a coil with an electrically non-conductive phase. Then, the voltage signal generation part 102 generates a voltage signal corresponding to an electric current flowing through the coil with the electrically non-conductive phase (step S13). The voltage signal generated by the voltage signal generation part 102 goes through one filter selected from among the filters F1 to Fn and is inputted to the comparator 113 via the selector 112.

The comparator 113 compares a voltage signal inputted through the selector 112 with a reference voltage Vref1 which the DAC 114 outputs. The timer 115 keeps counting until a timing at which it is determined that the voltage signal is equal to the reference voltage Vref1 in the comparator 113 and measures a voltage rise time (step S14). When the voltage rise time is measured, the control part 117 determines whether or not there is an electrically non-conductive phase whose voltage rise time has not been measured (step S15).

When the control part 117 determines that there is an unmeasured electrically non-conductive phase in step S15, the process returns to step S12 and the control part 117 supplies an electric current for measurement to a coil with an electrically conductive phase again. When it is determined that there is no unmeasured electrically non-conductive phase in step S15, the control part 117 determines whether or not all the phases are selected as electrically conductive phases (step S16). When it is determined that all the phases are not selected as electrically conductive phases in step S16, the process returns to step S11 and the control part 117 determines a next electrically conductive phase. The procedure so far may be the same as the procedure shown in FIG. 7 explained in Embodiment 1.

When it is determined that there is no phase that has not been selected as an electrically conductive phase in step S16, the control part 117 mutually compares the voltage rise time measured for every pattern of each electrically conductive phase and electrically non-conductive phase (step S18). The control part 117 determines whether the difference in the measured voltage rise time is equal to or greater than a predetermined threshold time difference (step S19). In step S19, the control part 117 specifies the longest voltage rise time in the voltage rise time measured as to each pattern, for example, and determines whether the difference between the specified longest voltage rise time and other voltage rise time is equal to or greater than a threshold time difference.

For example, among the measured voltage rise time tc (VU), tc (WU), tc (UV), tc (WV), tc (UW), and tc (VW), when the longest voltage rise time is called max_tc, the control part 117 compares the difference between the longest voltage rise time max_tc and the remaining voltage rise time with the threshold time difference ΔT1. The threshold time difference ΔT1 is a parameter which controls the determination accuracy set in advance according to the time resolution in the timer 115, the number of regions of the initial position determination, etc. If the time difference in voltage rise time is equal to or greater than a threshold time difference ΔT1, it becomes possible to determine whether the magnetic pole of the rotor exists in the U-phase direction, V-phase direction, or W-phase direction.

When it is determined in step 19 that the difference in voltage rise time is shorter than the threshold time difference, the control part 117 changes a filter selected by the filter selection part 116 for a filter whose filter constant is larger than a filter constant of the filter that has been used in the present measurement of the voltage rise time (step S20). For example, in step S20, when the filter that has been used in the present measurement is the filter Fi, the control part 117 changes the filter to be selected by the filter selection part 116 for a filter Fi+1. The process returns to step S11 after filters are changed, and the control part 117 determines a next electrically conductive phase in step S11. The control part 117 repeats measuring the voltage rise time of each pattern until it is determined in step S19 that a difference in voltage rise time is equal to or greater than a threshold time difference.

When it is determined that the difference in voltage rise time is equal to or greater than a threshold time difference in step S19, the control part 117 determines the initial position of the rotor (step S17). The algorithm of determination of the initial position of the rotor may be the same as that of what is explained in Embodiment 1.

Incidentally, when the filter Fn is already selected in the measurement of the voltage rise time, a filter to be changed in step S20 does not exist. When a difference in the voltage rise time is shorter than a threshold time difference and the filter used has a largest filter constant, the control part 117 may set a reference voltage Vref1 to a voltage higher than the present reference voltage Vref1 by a predetermined voltage within a voltage range equal to or lower than the maximum value Vref1_max of the predetermined reference voltage. The control part 117 may controls the DAC 114 to output a voltage which is made by adding a predetermined voltage ΔV to the reference voltage Vref1, for example, as a new reference voltage Vref1, and measure a voltage rise time again using the new reference voltage Vref1.

[Example of Operation Waveform]

Figure 12:
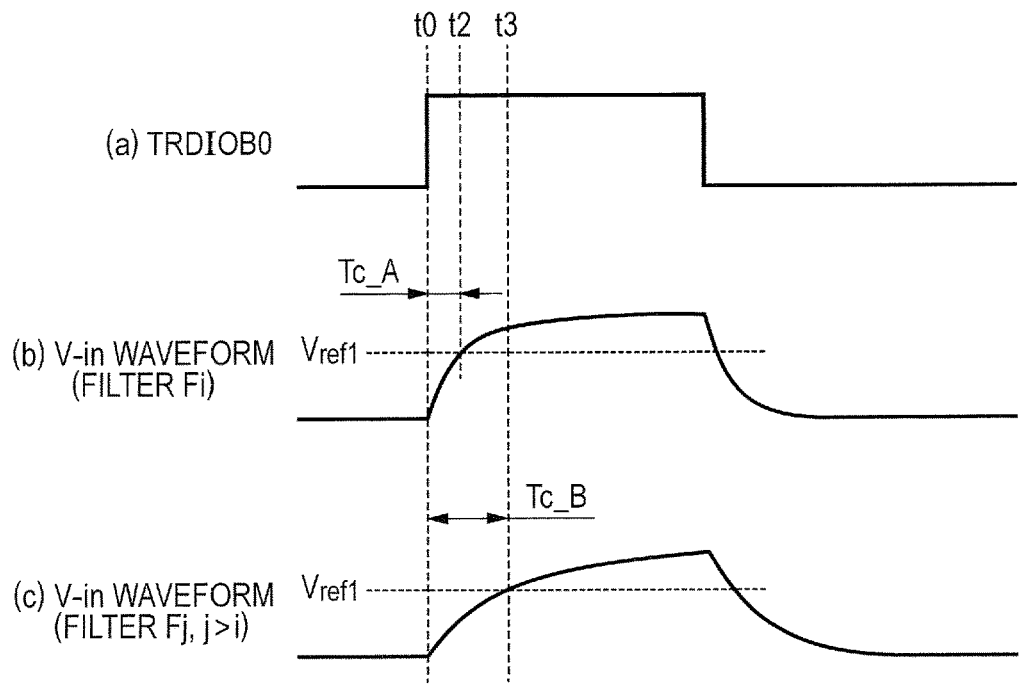

FIG. 12 is a waveform chart in which FIGS. 12A to 12C show operation waveforms of respective parts before and after switching filters. Although an example of a voltage waveform of the voltage signal V-in with the V phase when electricity is supplied to the coil 201U with the U phase will be explained below, voltage waveforms of voltage signals with other phases are also the same. In FIG. 12, FIG. 12A shows the signal TRDIOB0 which the motor control timer 111 outputs, FIG. 12B shows a signal waveform of the voltage signal V-in inputted to the comparator 113 when a filter Fi (i≠n) is selected in the LPF part, and FIG. 12C shows a signal waveform of the voltage signal V-in inputted to the comparator 113 when a filter Fj (j>i) is selected in the LPF section. In this regard, the filter constant of the filter Fj is larger than the filter constant of the filter Fi.

The motor control timer 111 changes the signal TRDIOB0 to be on the H level at time t0, and makes the transistor 141U (see FIG. 3) on the side of the power supply for motor of U phase contained in the inverter circuit 104 on (see FIG. 12A). When the filter Fi is chosen in the LPF section, the voltage signal V-in reaches the reference voltage Vref1 at the time t2 (see FIG. 12B). In this case, the timer 115 measures the time difference Tc_A from the time t0 to the time t2 as a voltage rise time.

Due to the causes such as the voltage rise time Tc_A is too short to the time resolution of the timer 115 etc., when a time difference with other voltage rise time is too short, it affects the determination of the initial position of the rotor. In that case, the filter selection part 116 selects the filter Fj whose filter constant is larger in step S20. When the filter Fj whose filter constant is larger is used, a rise of the voltage signal V-in inputted to the comparator 113 becomes milder than the case where the filter Fi is used. As a result, the voltage signal V-in inputted to the comparator 113 reaches the reference voltage Vref1 at the time t3 later than the time t2. In this case, the timer 115 measures a time difference Tc_B between the time t0 and the time t3 as a voltage rise time.

[Outline]

According to the present embodiment, the filter part 103 includes the filters used for the initial position determination process. When the filter used for measuring the voltage rise time is not suitable and a difference between the measured results of the voltage rise time is shorter than the threshold time difference, the control part 117 changes the filter to be used for a filter whose filter constant is larger, and measures the voltage rise time again. Since the motor driving device 100 can be used combined with various motors 200, it is conceivable that proper filter constants may vary according to types of the motors 200. However, in the present embodiment, when the initial position determination process cannot be performed with predetermined determination accuracy, the filter to be used is changed for the filter whose filter constant is larger. Therefore, it becomes possible to perform the position determination process with the predetermined accuracy.

[Modification]

In Embodiment 1, there has been explained the method where it is determined whether the pole exists in the θ2 region or in the θ5 region by comparing the sum of the voltage rise time tc (UW) and tc (VW) with the sum of the voltage rise time tc (WV) and tc (WU) when the magnetic pole exists in the W phase direction. However, the method of determining the region in which the magnetic pole exists is not limited to the above.

For example, when the magnetic pole exists in the W phase direction, the control part 117 may determine the region in which the magnetic pole exists according to the following procedures. First, using the motor control timer 111 and the inverter circuit 104, the control part 117 controls the transistor 141W (see FIG. 3) to be in an ON state and the transistors 142U and 142V to be in an ON state. In this case, the electric current flows from a current input/output terminal of the coil 201W with the W phase toward a current input/output terminal of the coil 201U with the U phase and a current input/output terminal of the coil 201V with the V phase. The control part 117 measures an electric current value i1 at this time. Subsequently, the control part 117 controls the transistors 141U and 141V to be in an ON state and the transistor 142W to be in an ON state. At this time, the electric current flows toward a current input/output terminal of the coil 201W with the W phase from a current input/output terminal of the coil 201U with the U phase and a current input/output terminal of the coil 201V with the V phase. The control part 117 measures an electric current value i2 at this time. Then, the control part 117 compares the measured electric current values. If i1>i2, the control part 117 determines that the magnetic pole exists in the region of θ2 and, if i1<i2, the control part 117 determines that the magnetic pole exists in the region of θ5.

When the magnetic pole exists in the U phase direction, first, using the motor control timer 111 and the inverter circuit 104, the control part 117 controls the transistor 141U to be in an ON state and the transistors 142V and 142W to be in an ON state. In this case, an electric current flows toward the current input/output terminal of the coil 201V of the V phase and the current input/output terminal of the coil 201W with the W phase from the current input/output terminal of the coil 201U with the U phase. The control part 117 measures the current value i1 at this time. Subsequently, the control section 117 controls transistors 141V and 141W to be in an ON state and a transistor 142U to be in an ON state. In this case, an electric current flows toward the current input/output terminal of the coil 201U with the U phase from the current input/output terminal of the coil 201V with the V phase and the current input/output terminal of the coil 201W with the W phase. The control part 117 measures current value i2 at this time. The control part 117 compares the measured current values. If i1>i2, the control part 117 determines that a magnetic pole exists in the region of θ4. Also, if i1<i2, the control part 117 determines that a magnetic pole exists in the region of θ1.

When the magnetic pole exists in the V phase direction, first, using the motor control timer 111 and the inverter circuit 104, the control part 117 control a transistor 141V to be in an ON state and transistors 142U and 142W to be in an ON state. In this case, an electric current flows toward the current input/output terminal of the coil 201U with the U phase and the current input/output terminal of the coil 201W with the W phase from the current input/output terminal of the coil 201V with the V phase. The control part 117 measures the current value i1 at this time. Subsequently, the control part 117 controls transistors 141U and 141W to be in an ON state and a transistor 142V to be in an ON state. In this case, an electric current flows toward the current input/output terminal of the coil 201V with the V phase from the current input/output terminal of the coil 201U with the U phase and the current input/output terminal of the coil 201W with the W phase. The control part 117 measures electric current value i2 at this time. The control part 117 compares the measured current values. If i1>i2, the control part 117 determines that a magnetic pole exists in the region of θ6. Also, if i1<i2, the control part 117 determines that a magnetic pole exists in the region of θ3.

Moreover, in Embodiment 1, there has been explained an example where angle determination is performed with accuracy of 60 degrees by determining which of the voltage rise time tc (VU), tc (WV), and tc(s) (UW) is the longest. However, the method is not limited to this. Angle determination can also be performed at intervals of 15 degrees by determining the largest value and the smallest value of the voltage rise time measured with respect to the combination of electrically conductive phases and electrically non-conductive phases, the values being close to each other of the voltage rise time measured with respect to two combinations, or the values being apart from each other of the voltage rise time measured with respect to three combinations.

Figure 13:
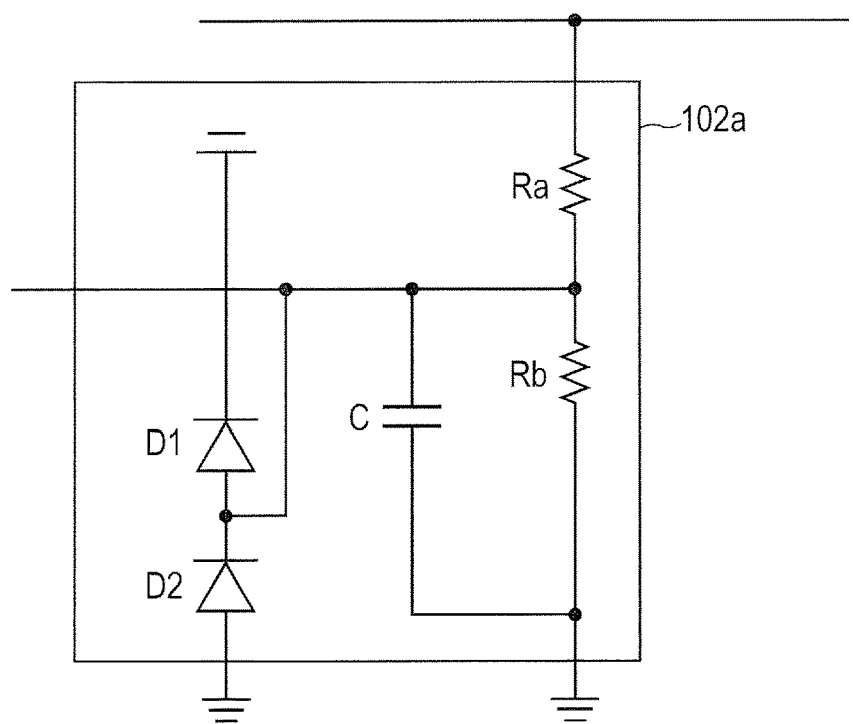
FIG. 13 is a block diagram showing another configuration example of the voltage signal generation part.

In FIGS. 1 and 2, there have been shown examples where the voltage signal generation part 102 includes two resistors coupled in series. However, the configuration of the voltage signal generation part 102 is not limited to this. FIG. 13 shows another example of a configuration of the voltage signal generation part. In addition to two resistors Ra and Rb coupled in series mutually, the voltage signal generation part 102a according to another configuration example has a capacitor C and diodes D1 and D2. The capacitor C couples the connection node of the two resistors Ra and Rb with earth potentials. The diodes D1 and D2 are placed in series between the power supply on a high potential side and the earth potential. A cathode of the diode D1 is coupled to the power supply on the high potential side and an anode of the diode D2 is coupled to the earth potential. The connection nodes of the diodes D1 and D2 are coupled to an output-signal line of the voltage signal generation part 102a. When the voltage signal generation part 102a of such a configuration is used, it becomes possible to prevent an excessive voltage or a voltage signal of negative voltage from being inputted to the comparator 113 in the subsequent step (see FIG. 1).

Up to this point, the invention completed by the present inventors was described by way of the embodiments. However, it is naturally understood that the present invention is not limited to the embodiment, and may be variously changed within the scope not departing from the gist thereof.

What is claimed is:

1. A motor driving device, comprising:
   an inverter circuit coupled to each of coils with a plurality of phases of a brushless DC motor including a rotor having a permanent magnet with a plurality of poles and a stator having the coils with the phases;
   an electrical conduction control part which controls electrical conduction to each of the coils with the phases through the inverter circuit;
   voltage signal generation parts each of which includes a plurality of resistors coupled to the coils with the phases and generates a voltage signal corresponding to an electric current flowing the coils;
   a filter part including a first filter and a second filter whose filter constant is smaller than that of the first filter;
   a filter selection part which selects one of the first filter and the second filter;
   a comparator which compares the voltage signal inputted through the filter selected by the filter selection part with a predetermined reference voltage; and
   a control part which performs an initial position determination process for determining the initial position of the rotor and a rotation driving process for rotating the rotor with use of a comparison result in the comparator,
   wherein the control part controls the filter selection part to select the first filter when performing the initial position determination process and controls the filter selection part to select the second filter when performing the rotation driving process.

2. The motor driving device according to claim 1 further comprising a timer for measuring a voltage rise time which shows a time difference between a predetermined timing and a timing at which it is determined that the voltage signal is equal to a first reference voltage in the comparator, wherein the control part controls the electrical conduction control part to supply electric currents to the coils with the phases while changing electrically conductive phases in the initial position determination process, controls the voltage signal generation part to generate a voltage signal corresponding to an electric current flowing through each of coils with other phases coupled to the coils to which the electric currents are supplied, controls the timer to measure the voltage rise time with respect to each of the coils with the other phases, and determines the initial position of the rotor based on a measurement result of the voltage rise time.

3. The motor driving device according to claim 2,
wherein the first filter includes a plurality of low-pass filters whose filter constants are different from one another, and
wherein the control part controls the filter selection part to select one of the low-pass filters in the initial position determination process and, when a difference in the voltage rise time measured with respect to each phase is shorter than the predetermined threshold time difference, controls the filter selection part to change the low-pass filter selected for a low-pass filter whose filter constant is larger than that of the low-pass filter used in measuring the voltage rise time.

4. The motor driving device according to claim 3, wherein the control part specifies a longest voltage rise time among the voltage rise time measured with respect to each phase and determines whether or not a difference between the specified longest voltage and another voltage rise time is shorter than the threshold time difference.

5. The motor driving device according to claim 3, wherein the control part determines an initial position of the rotor when the difference in the voltage rise time is equal to or greater than the threshold time difference.

6. The motor driving device according to claim 3, wherein the control part sets the first reference voltage to a voltage higher than the voltage used in measuring the voltage rise time when the difference in the voltage rise time is shorter than the threshold time difference and the low-pass filter used in measuring the voltage rise time is a low-pass filter having a largest filter constant.

7. The motor driving device according to claim 1, wherein, terminals opposite to the electric-current input terminal sides of coils of respective phases are coupled with each other in the stator.

8. The motor driving device according to claim 1, wherein, in the rotation driving process, the control part supplies an exciting current from a coil with one phase to a coil with another phase using the electrical conduction control part, controls the voltage signal generation part to generate a voltage signal corresponding to an induced electromotive force generated in a coil with an electrically non-conductive phase being different from the phase to which the exciting current is supplied, and switches the coil phase to which the exciting current is supplied based on a timing at which it is determined that the voltage signal is equal to a second reference voltage in the comparator.

9. The motor driving device according to claim 1, wherein the control part performs the initial position determination process by controlling the filter selection part to select the first filter and, after the initial position determination process, starts the rotation driving process by controlling the filter selection part to select the second filter.

10. The motor driving device according to claim 1, wherein, in the rotation driving process, the control part determines an electrically conductive coil phase for rotating the rotor in a predetermined direction based on the measurement result of the initial position of the rotor in the initial position determination process.

11. A motor driving method for rotating a brushless DC motor including a rotor having a permanent magnet with a plurality of poles and a stator having coils with a plurality of phases, comprising the steps of:
supplying electric currents to the coils with the phases while changing electrically conductive phases;
generating a voltage signal corresponding to an electric current flowing through each of coils with other phases coupled to the coils to which the electric currents are supplied;
inputting the voltage signal to a comparator through a first filter;
measuring, with respect to each of the coils with the other phases, a voltage rise time which shows a time difference between a predetermined timing and a timing at which it is determined that the voltage signal is equal to a first reference voltage in the comparator;
determining an initial position of the rotor based on a measurement result of the voltage rise time;
determining an electrically conductive phase based on a determination result of the initial position of the rotor;
starting a rotation driving process of the rotor by supplying an exciting current to a coil with the determined electrically conductive phase;
inputting a voltage signal, corresponding to an induced electromotive force generated in a coil with an electrically non-conductive phase being different from the phase to which the exciting current is supplied, to the comparator through a second filter whose filter constant is smaller than that of the first filter; and
rotating the rotor by switching the coil phase to which the exciting current is supplied based on a timing at which it is determined that the voltage signal is equal to a second reference voltage in the comparator.

12. A non-transitory computer readable storage medium for allowing a computer to rotate a brushless DC motor including a rotor having a permanent magnet with a plurality of poles and a stator having coils with a plurality of phases, comprising the steps of:
controlling the computer to supply electric currents to the coils with the phases while changing electrically conductive phases;
controlling a timer to measure a voltage rise time, with respect to each of the coils with the other phases, showing a time difference between a predetermined timing and a timing at which it is determined that a voltage signal corresponding to an electric current flowing through each of coils with other phases coupled to the coils to which the electric currents are supplied is equal to a first reference voltage in a comparator to which the voltage signal is inputted through a first filter;
determining an initial position of the rotor based on a measurement result of the voltage rise time;
determining an electrically conductive phase based on a determination result of the initial position of the rotor;
starting a rotation driving process of the rotor by supplying an exciting current to a coil with the determined electrically conductive phase; and
rotating the rotor by switching the coil phase to which the exciting current is supplied with a timing at which it is determined that a voltage signal corresponding to an induced electromotive force generated in a coil with an electrically non-conductive phase being different from the phase to which the exciting current is supplied is equal to a second reference voltage in a comparator to which the voltage signal is inputted through a second filter whose filter constant is smaller than that of the first filter.

* * * * *